US008943198B2

(12) United States Patent
Lukas et al.

(10) Patent No.: US 8,943,198 B2
(45) Date of Patent: Jan. 27, 2015

(54) AUTOMATICALLY ADDRESSING PERFORMANCE ISSUES IN A DISTRIBUTED DATABASE

(71) Applicant: International Business Machines Corporation, Armonk, NY (US)

(72) Inventors: Joshua Lukas, Mazeppa, MN (US); Gary R. Ricard, Chatfield, MN (US); Timothy L. Thompson, Rochester, MN (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 312 days.

(21) Appl. No.: 13/675,032

(22) Filed: Nov. 13, 2012

(65) Prior Publication Data

US 2014/0136682 A1 May 15, 2014

(51) Int. Cl.
*G06F 15/173* (2006.01)
*G06F 12/00* (2006.01)

(52) U.S. Cl.
USPC ........................................... 709/224

(58) Field of Classification Search
CPC ........... G06F 11/3409; G06F 11/3466; G06F 2201/88; G06F 11/3476; G06F 2201/815; G06F 11/3495; G06F 2201/81; G06F 8/20; G06F 11/1438; G06F 11/3433; G06F 11/3438; G06F 17/30002; G06F 2201/865
USPC ................. 709/223–229, 250, 203, 217–218; 707/964, 609
See application file for complete search history.

(56) References Cited

U.S. PATENT DOCUMENTS

| 7,403,946 | B1* | 7/2008 | Taylor | 707/612 |
| 7,467,198 | B2* | 12/2008 | Goodman et al. | 709/223 |
| 7,778,257 | B1 | 8/2010 | Bishara et al. | |
| 7,957,991 | B2* | 6/2011 | Mikurak | 705/7.11 |
| 8,135,859 | B1* | 3/2012 | Kelly et al. | 709/245 |
| 2003/0187853 | A1* | 10/2003 | Hensley et al. | 707/10 |
| 2004/0252722 | A1 | 12/2004 | Wybenga et al. | |
| 2009/0161569 | A1 | 6/2009 | Corlett | |
| 2010/0107085 | A1* | 4/2010 | Chadwick et al. | 715/738 |
| 2010/0257258 | A1* | 10/2010 | Liu et al. | 709/220 |
| 2013/0060782 | A1* | 3/2013 | Bailey et al. | 707/741 |

OTHER PUBLICATIONS

Anonymous; "System and method for the dynamic optimization of query tables"; http://priorartdatabase.com/IPCOM/000197961; Jul. 23, 2010.
IBM; "Physical network optimization based on virtual network characteristics and job requirements in a multi-nodal system"; http://www.ip.com/pubview/IPCOM000188729D, Oct. 20, 2009.

(Continued)

*Primary Examiner* — Zarni Maung
(74) *Attorney, Agent, or Firm* — Katherine S. Brown; Jeffrey L. Streets

(57) ABSTRACT

A database performance monitor monitors performance of a distributed database, identifies a database performance issue for the distributed database, determines from a distributed virtual network mechanism which physical networks are related to the database performance issue, determines a potential solution to the database performance issue that changes configuration of the distributed database, and applies the potential solution by automatically changing configuration of the distributed database without intervention of a user to address the database performance issue.

4 Claims, 8 Drawing Sheets

(56) References Cited

OTHER PUBLICATIONS

Anonymous; "Method for Ethernet traffic path control for isolated sub-networks by VLAN and an algorithm for two-layer network optimization of VLAN isolated sub-networks"; http://priorartdatabase.com/IPCOM/000216616; Apr. 10, 2012.

Henschen, Doug, "Oracle Makes Big Data Appliance Move With Cloudera", http://www.informationweek.com/software/information-management/oracle-makes-big-data-appliance-move-wit/232400021, Jan. 10, 2012.

Thomson, Iain, "AWS takes NoSQL database to the cloud with DynamoDB", http://www.theregister.co.uk/2012/01/19/aws_amazondb_cloud_database/, Jan. 19, 2012.

* cited by examiner

| Database Cluster Performance on Tuesday Afternoons |
|---|
| CPU Usage for Host Group #1 = 90% |
| Network Utilization for Virtual Ethernet Network #1 = 10% |
| Network Utilization for Hardware Link #1 = 100% |

FIG. 13

| Possible Solution #1 |
|---|
| Move data for workload X to cluster segment that does not use Hardware Link #1 |

FIG. 14

AUTOMATICALLY ADDRESSING PERFORMANCE ISSUES IN A DISTRIBUTED DATABASE

BACKGROUND

1. Technical Field

This disclosure generally relates to computer systems, and more specifically relates to management of a distributed database.

2. Background Art

Distributed databases have been developed that include multiple computer systems or nodes that each include a portion of data in the distributed database. Many distributed databases need to be highly available, so they are implemented in a cloud-based manner that uses advanced virtualization techniques to mask the underlying hardware implementation. These virtualization techniques, by masking the underlying hardware implementation, can make it more difficult to identify and address some performance issues in the distributed database.

BRIEF SUMMARY

A database performance monitor monitors performance of a distributed database, identifies a database performance issue for the distributed database, determines from a distributed virtual network mechanism which physical networks are related to the database performance issue, determines a potential solution to the database performance issue that changes configuration of the distributed database, and applies the potential solution by automatically changing configuration of the distributed database without intervention of a user to address the database performance issue.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 13 is a block diagram showing database cluster performance on Tuesday afternoons that includes hardware link utilization for a hardware network related to the identified performance issue; and FIG. 14 is a block diagram sowing a first potential solution to the database performance issue shown in FIG. 8 based on the network utilization for a hardware link shown in FIG. 13.

DETAILED DESCRIPTION

The disclosure and claims herein disclose a database performance monitor that monitors performance of a distributed database, identifies a database performance issue for the distributed database, determines from a distributed virtual network mechanism which physical networks are related to the database performance issue, determines a potential solution to the database performance issue that changes configuration of the distributed database, and applies the potential solution by automatically changing configuration of the distributed database without intervention of a user to address the database performance issue.

Figure 1:
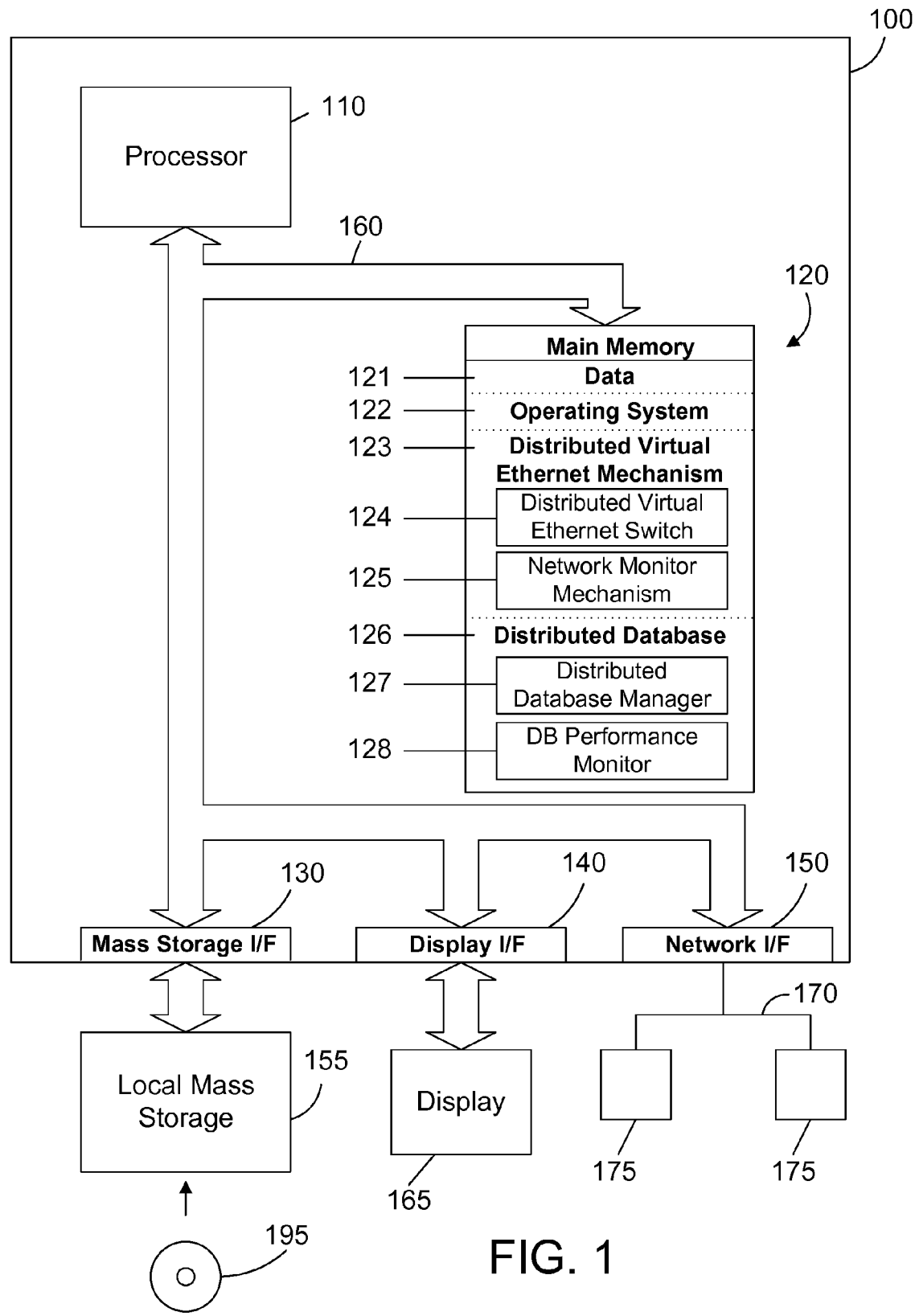
FIG. 1 is a block diagram of an apparatus that includes a distributed virtual network mechanism and a database performance monitor.

Referring to FIG. 1, a computer system 100 is one suitable implementation of a server computer system that includes a distributed virtual Ethernet mechanism and a database performance monitor. Server computer system 100 is an IBM zEnterprise System computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195.

Main memory 120 preferably contains data 121, an operating system 122, a distributed virtual Ethernet mechanism 123, and a distributed database 126. Data 121 represents any data that serves as input to or output from any program in computer system 100. Operating system 122 is a multitasking operating system. Distributed virtual Ethernet mechanism 123 is a distributed virtual networking mechanism that virtualizes underlying hardware for a variety of different types of network connections into a single virtual view that allows easy interaction between components connected to the distributed virtual Ethernet mechanism 123. The representation of distributed virtual Ethernet mechanism 123 shown in the main memory 120 in FIG. 1 is a logical representation showing an implementation in software that resides in the main memory 120. In actual implementation, the distributed virtual Ethernet mechanism 123 could be any suitable combination of hardware and software. The distributed virtual Ethernet mechanism 123 includes a distributed virtual Ethernet switch 124 and a network monitor mechanism 125. The distributed virtual Ethernet switch 124 provides a single virtualized view of underlying potentially disparate hardware networks. The network monitor mechanism 125 monitors network usage of both the virtual networks and the hardware networks in the distributed virtual Ethernet switch 124. By monitoring network usage of both virtual and hardware networks, the distributed virtual Ethernet mechanism 123 has information that may be used by a distributed database to potentially automatically resolve a performance issue that arises in the distributed database.

There is an inherent problem that arises from virtualizing all underlying hardware networks in the distributed virtual Ethernet switch 124. This virtualization provides a very convenient single point of contact for managing network communications in a networked computer system such as a distributed database. However, by virtualizing the underlying hardware networks, the specific implementation and even performance of the hardware networks are not visible to software that uses the distributed virtual Ethernet mechanism. Thus, the convenient virtualized interface provided by the distributed virtual Ethernet mechanism comes at the cost of masking performance of the underlying hardware. The distributed virtual Ethernet mechanism 123 solves this problem by providing a network monitor mechanism 125 that not only monitors usage of virtual networks, but underlying hardware networks as well. The distributed virtual Ethernet mechanism 123 thus provides a convenient single point where performance of both virtual and hardware networks may be managed.

Figure 4:
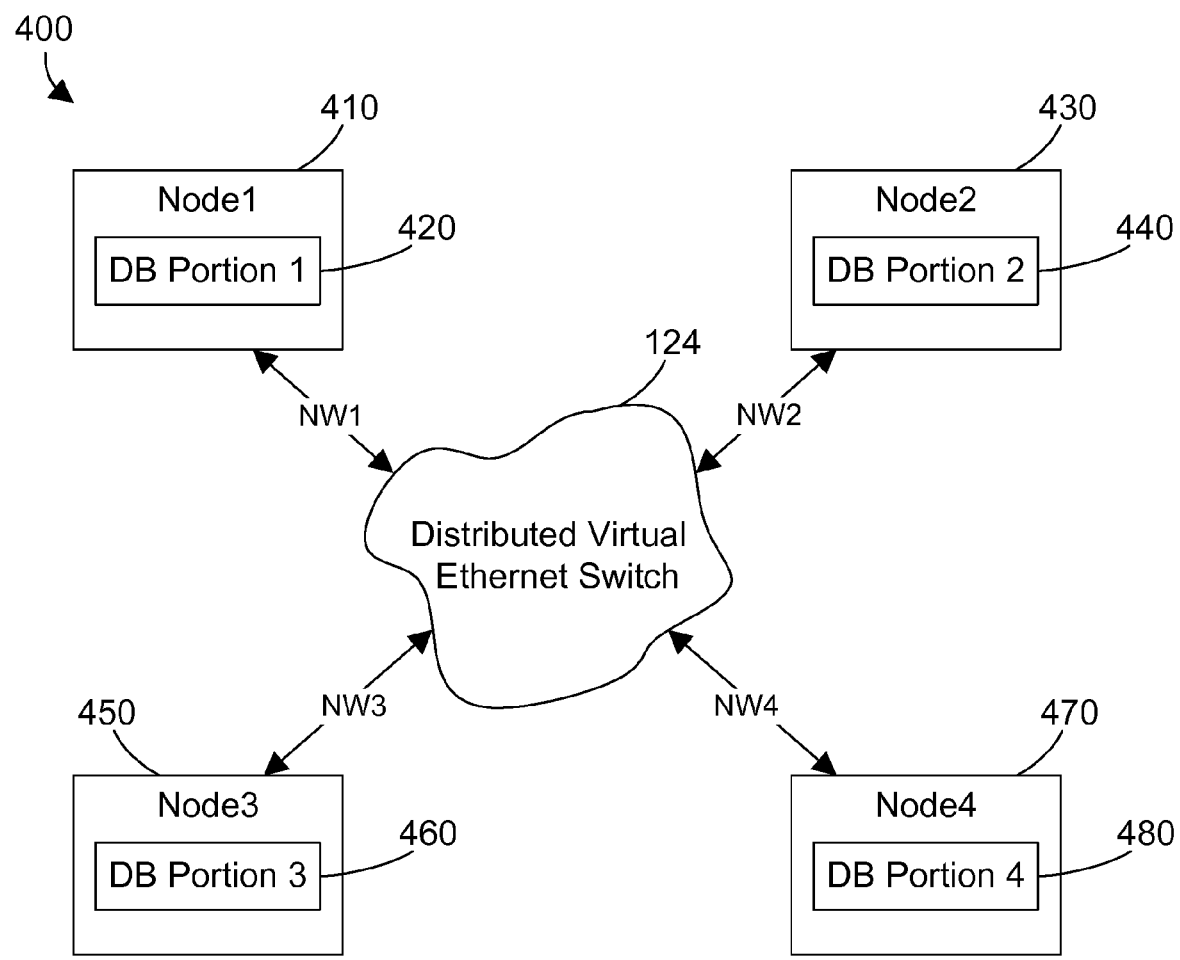
FIG. 4 is a block diagram of a sample distributed database.

The distributed database 126 in FIG. 1 is a logical representation of a distributed database that resides in memory of multiple nodes in a networked computer system, such as distributed database 400 shown in FIG. 4. The distributed database 126 includes a distributed database manager 127 and a database performance monitor 128. The distributed database manager 127 manages allocation of jobs to the distributed database, manages configuration of the distributed database, and performs other management functions with respect to the distributed database 126. The database performance monitor 128 monitors performance of the distributed database 126, detects a performance issue, determines from the network monitor mechanism 125 in the distributed virtual Ethernet mechanism 123 which hardware and virtual networks are related to the performance issue, and attempts to reconfigure the distributed database 126 to resolve the performance issue. Because all the network performance related to the distributed database is available at a single point in the distributed virtual Ethernet mechanism 123, the database performance monitor 128 may determine performance of both virtual networks and hardware networks by accessing the network monitor mechanism 125. The database performance monitor 128 can thus address performance issues in the distributed database that are caused by congestion of hardware networks instead of by looking only at virtual network utilization.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, distributed virtual Ethernet mechanism 123 and distributed database 126 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the distributed virtual Ethernet mechanism 123, the distributed database manager 127, and the database performance monitor 128.

Although computer system 100 is shown to contain only a single processor and a single system bus, those skilled in the art will appreciate that a database performance monitor may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 thus connects the apparatus 100 to other computer systems (e.g., 175 in FIG. 1) in a networked computer system. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allow communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
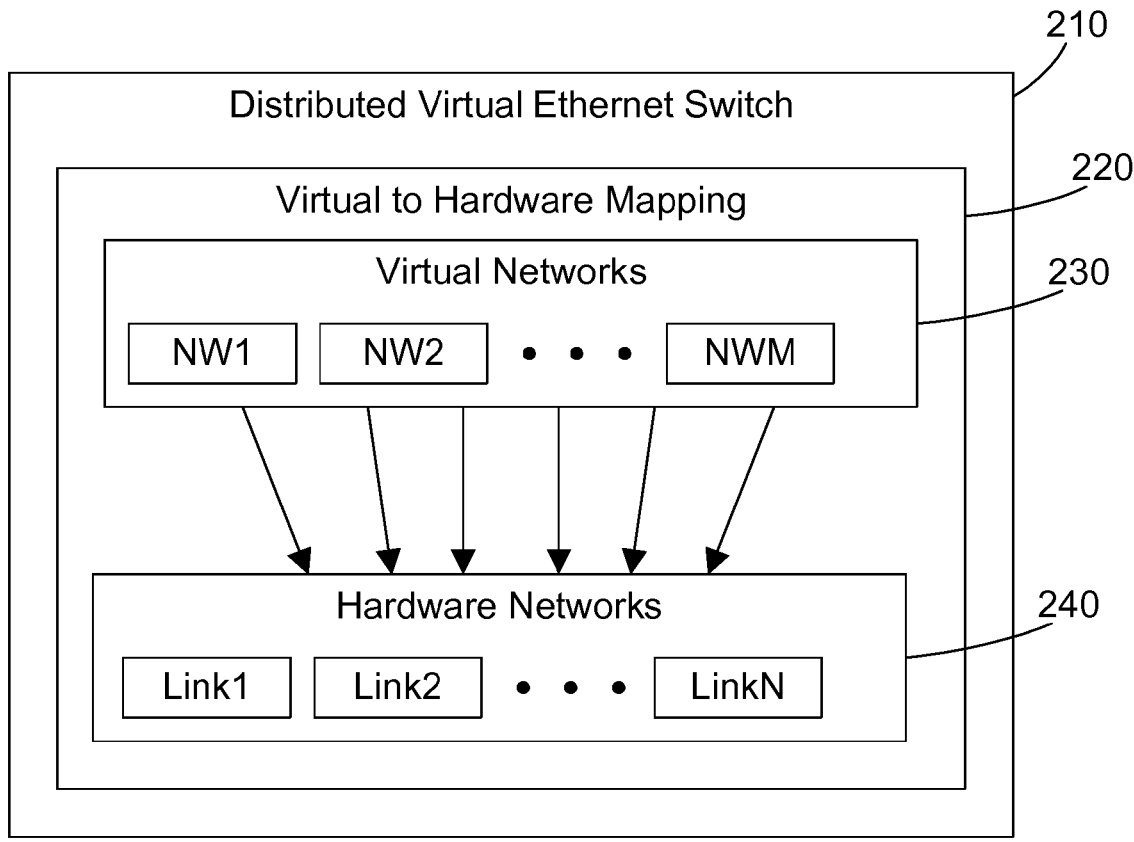
FIG. 2 is a block diagram of a distributed virtual Ethernet switch.

Referring to FIG. 2, a distributed virtual Ethernet switch 210 is shown, which is one suitable implementation for the distributed virtual Ethernet switch 124 shown in FIG. 1. The distributed virtual Ethernet switch 210 includes a virtual to hardware mapping 220 that correlates multiple virtual networks 230, shown in FIG. 2 as NW1, NW2, ..., NWM, to multiple hardware networks 240, shown in FIG. 2 as Link1, Link2, ..., LinkN. Note there is not necessarily a one-to-one correspondence between virtual networks 230 and hardware networks 240 because a single hardware network can implement multiple virtual networks. The virtual networks 230 provide a virtualized view of the networks interconnecting the distributed database. This allows the underlying hardware implementation of multiple different hardware networks to be hidden or masked via the virtual networks. Thus, a virtual network may be represented as a virtual Ethernet network even when the underlying hardware is something other than an Ethernet network, such as a specialized network chip. However, because the distributed virtual Ethernet switch 210 includes the virtual to hardware mapping 220, this makes the distributed virtual Ethernet switch 210 a central place where information regarding the topology of hardware networks may be accessed.

Figure 3:
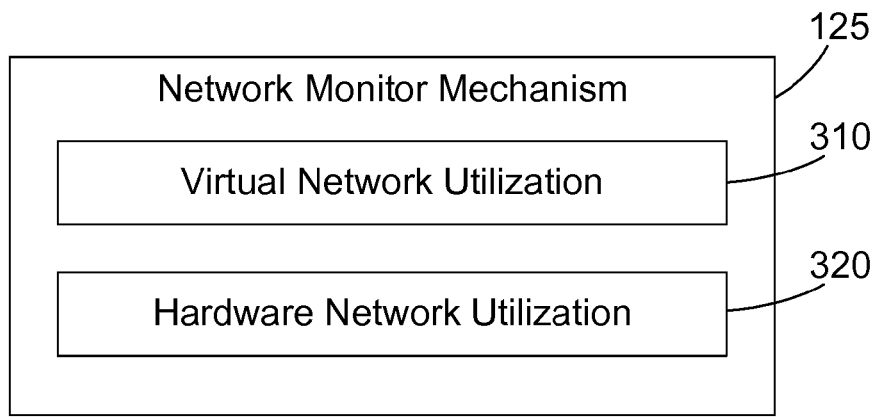
FIG. 3 is a block diagram of the network monitor mechanism shown in FIG. 1.

Referring to FIG. 3, the network monitor mechanism 125 shown in FIG. 1 determines both virtual network utilization 310 and hardware network utilization 320. This makes the distributed virtual Ethernet mechanism 123 a central repository for determining network utilization of not only virtual networks but hardware networks as well.

FIG. 4 shows one sample implementation of a distributed database 400 running on four nodes 410, 430, 450 and 470. The database is distributed by virtue of having different portions of the database distributed in the memory of different nodes. Note the memory in each node may include any suitable memory in the memory hierarchy, including mass storage. Thus, node1 410 includes a first database portion 420; node2 430 includes a second database portion 440; node3 450 includes a third database portion 460; and node4 470 includes a fourth database portion 480. Node1 410 is connected to the distributed virtual Ethernet switch 124 via a virtual network denoted NW1 in FIG. 4. In similar fashion, node2, node3 and node4 are connected to the distributed virtual Ethernet switch 124 via virtual networks NW2, NW3 and NW4, respectively. Note the combination of hardware and software in a distributed database, such as distributed database 400 in FIG. 4, is shown logically for the sake of simplicity as distributed database 126 in FIG. 1.

Figure 5:
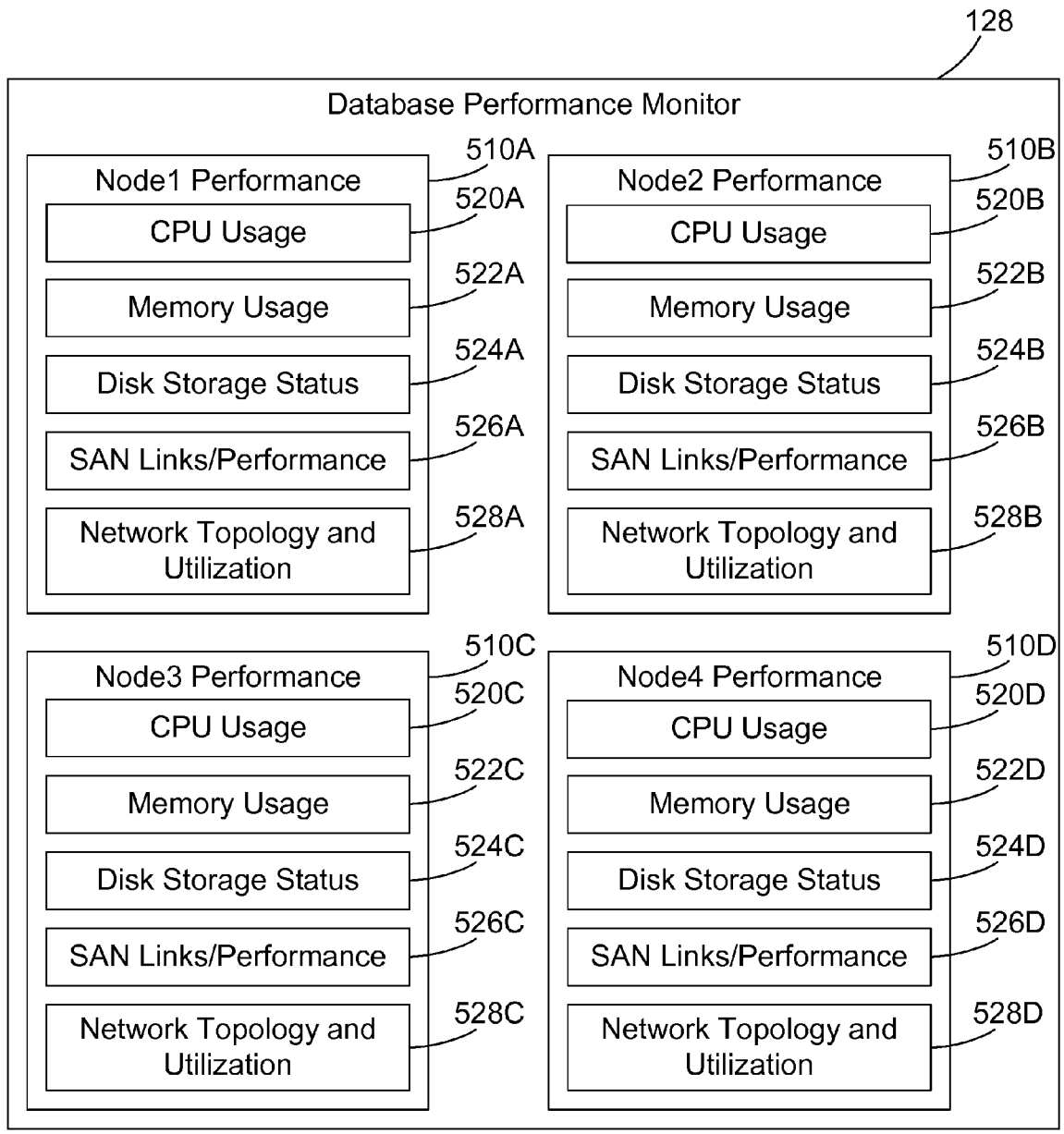
FIG. 5 is a block diagram showing database performance for the four nodes in FIG. 4 monitored by the database performance monitor in FIG. 1.

Referring to FIG. 5, the database performance monitor 128 (also shown in FIG. 1) collects performance parameters for each node in a distributed database. In one suitable implementation, there is a separate database performance monitor for each cluster in a distributed database. We assume the four nodes shown in FIG. 4 are in the same cluster, and the database performance monitor 128 collects performance information for each of the four nodes. Database performance monitor 128 thus includes Node1 performance 510A, Node2 performance 510B, Node3 performance 510C, and Node4 performance 510D. The performance for each node includes CPU usage, memory usage, disk storage status, storage area network (SAN) links and performance, and network topology and utilization. Thus, node1 performance 510A includes CPU usage 520A, memory usage 522A, disk storage status 524A, SAN links/performance 526A, and network topology and utilization 528A; node2 performance 510B includes CPU usage 520B, memory usage 522B, disk storage status 524B, SAN links/performance 526B, and network topology and utilization 528B; node3 performance 510C includes CPU usage 520C, memory usage 522C, disk storage status 524C, SAN links/performance 526C, and network topology and utilization 528C; and node4 performance 510D includes CPU usage 520D, memory usage 522D, disk storage status 524D, SAN links/performance 526D, and network topology and utilization 528D. By monitoring performance of the nodes in a distributed database, the database performance monitor 128 has information needed to reconfigure automatically the distributed database when a performance issue arises. CPU usage relates to how much of the CPU capacity in a node is being used. Memory usage relates to how much of the memory capacity in a node is being used. Disk storage status relates to the status of any disk that is part of the node. SAN links/performance relates to whether or not the node is connected to a SAN, and if so, the performance of the SAN. Network topology and utilization relates to the topology and utilization of both virtual networks and hardware networks. In the most preferred implementation, the network topology and utilization for each node is determined by querying the distributed virtual Ethernet mechanism 123. Because the network monitor mechanism 125 monitors network utilization for both virtual networks and hardware networks (see FIG. 3), and because the distributed virtual Ethernet switch 124 includes information related to network topology for both virtual networks and hardware networks, querying the distributed virtual Ethernet mechanism 123 allows the database performance monitor 128 to determine which virtual networks and which hardware networks are related to the identified database performance issue, and to determine performance for both virtual and hardware networks for a given node that are related to the identified database performance issue.

Figure 6:
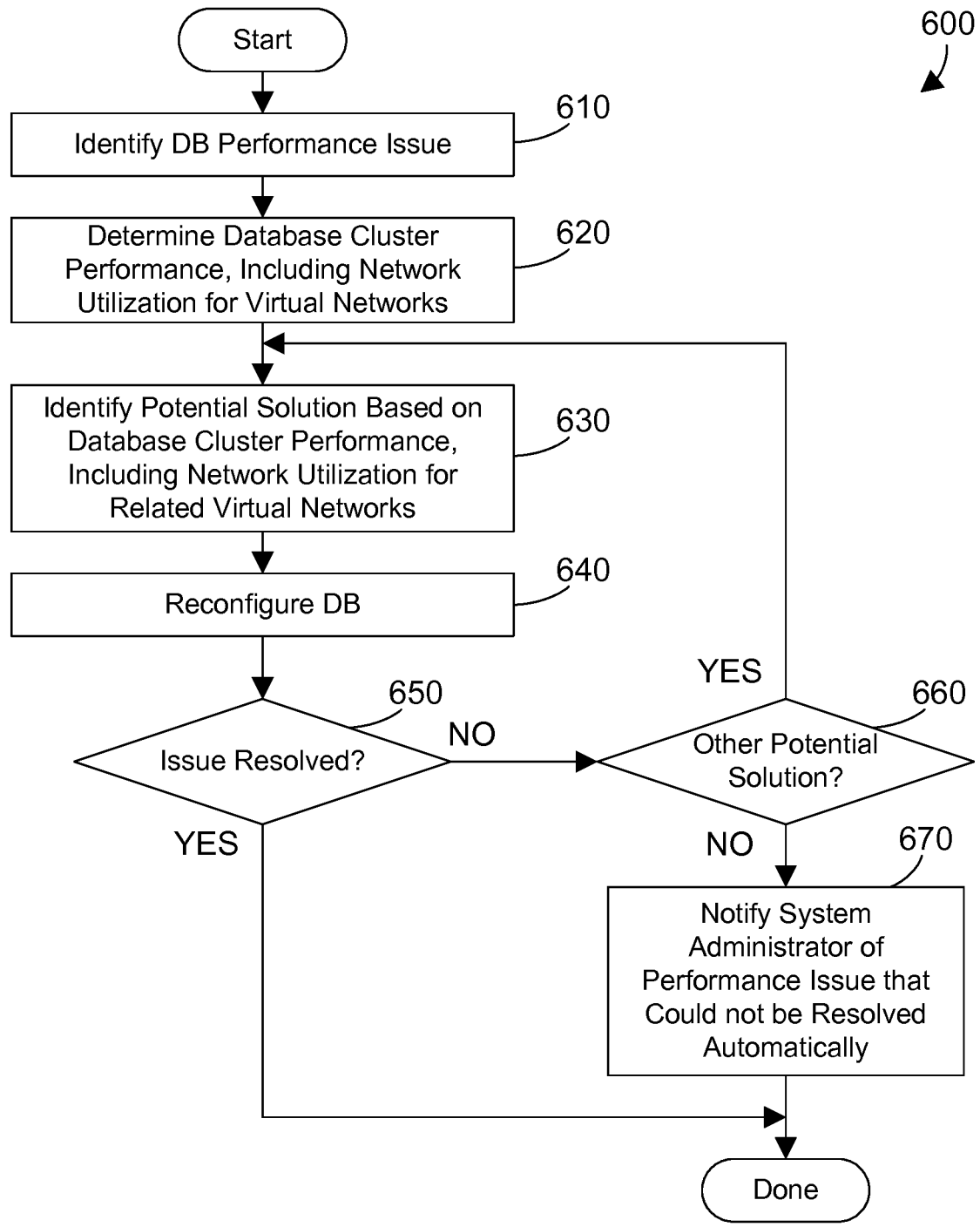
FIG. 6 is a flow diagram of a method for identifying a performance issue in a distributed database and attempting to automatically address the performance issue based on virtual network information available in a distributed virtual network mechanism.

Referring to FIG. 6, a method 600 shows one way to automatically address performance issues in a distributed database. A database performance issue is identified (step 610). Various database performance issues may be identified in step 610, including database performance issues detected by heuristic analysis, database performance issues due to network traffic, database performance issues due to network utilization, database performance issues due to database security issues, and database performance issues caused by hardware failures. Of course, other database performance issues not listed herein are within the scope of the disclosure and claims. Performance for the database cluster is determined, including network utilization for virtual networks (step 620). A potential solution is identified based on the database cluster performance, including the network utilization for related virtual networks (step 630). A virtual network is related to the database performance issue when performance of the virtual network may affect the database performance issue. The database is then automatically reconfigured without intervention of a user (step 640) to apply the potential solution identified in step 630. When the database performance issue is resolved (step 650=YES), method 600 is done. When the database performance issue is not resolved (step 650=NO), method 600 determines whether there are any other potential solutions to the identified database performance issue (step 660). If so (step 660=YES), method 600 loops back to step 630 and continues. When there is no other potential solution (step 660=NO), a notification is sent to a system administrator of the performance issue that could not be resolved automatically (step 670). Method 600 is then done. Note that method 600 uses database cluster information, including utilization for virtual networks, in identifying potential solutions and reconfiguring the distributed database accordingly. Note, however, that considering only virtual network utilization can mask network problems in the hardware networks. Thus, even though a virtual network NW1 may have only 40% utilization, its underlying hardware link could be used by other virtual networks as well, resulting in the hardware link having 100% utilization. Thus, in the most preferred implementation, utilization of both virtual networks and hardware networks is considered, as shown in method 700 in FIG. 7.

Figure 7:
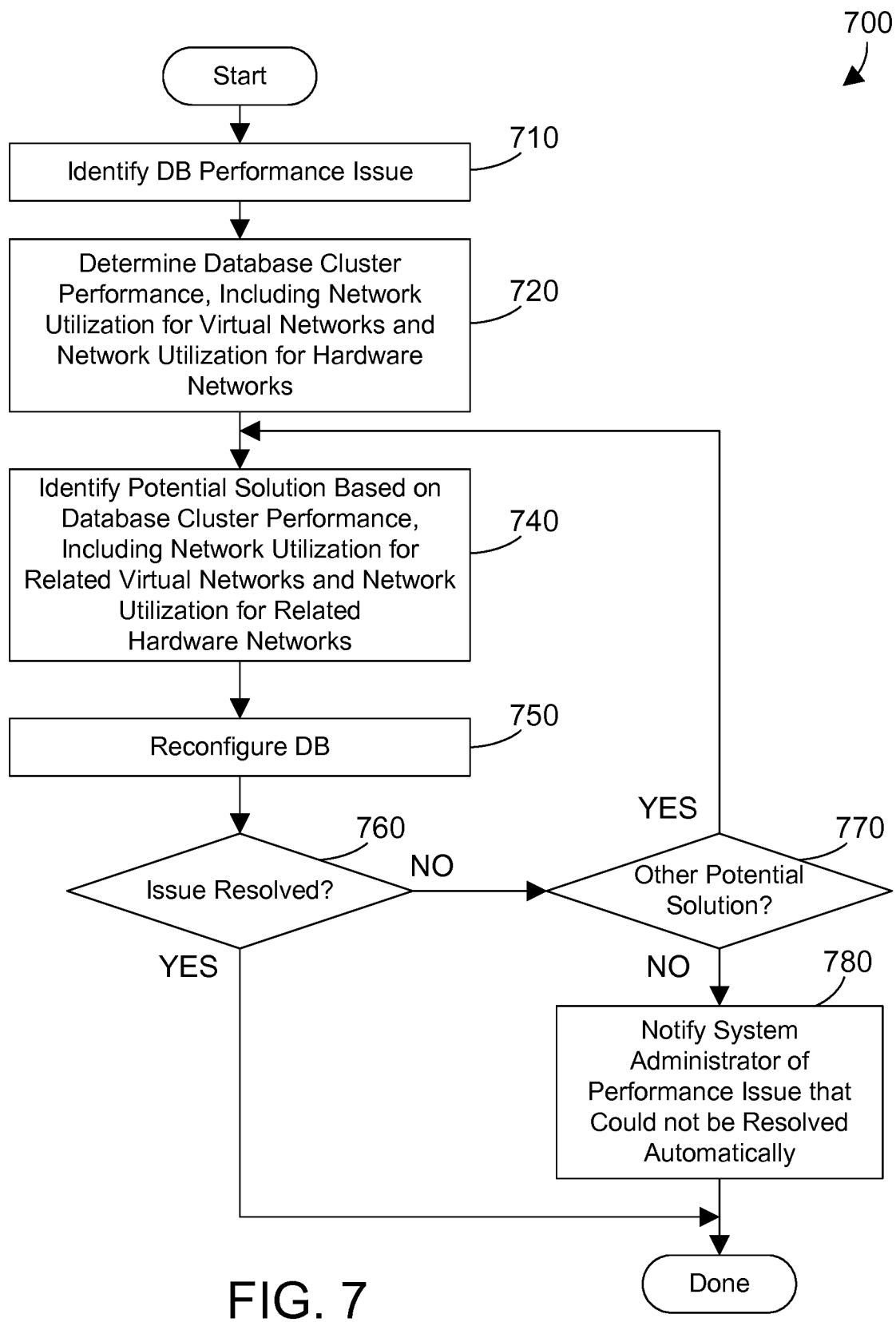
FIG. 7 is a flow diagram of a method for identifying a performance issue in a distributed database and attempting to automatically address the performance issue based on both virtual and physical network information available in a distributed virtual network mechanism.

Referring to FIG. 7, method 700 identifies a database performance issue (step 710). As described above with respect to step 610 in FIG. 6, the disclosure and claims herein extend to identifying any suitable database performance issue whatever the cause or how the database performance issue is identified or detected. Database cluster performance is determined, including network utilization for virtual networks and network utilization for hardware networks (step 720). A potential solution is identified based on the database cluster performance, including network utilization for related virtual networks and network utilization for related hardware networks (step 740). A virtual network or hardware network is related to the database performance issue when performance of the network may affect the database performance issue. The distributed database is then reconfigured (step 750) according to the identified potential solution in step 740. When the issue is resolved (step 760=YES), method 700 is done. When the issue is not resolved (step 760=NO), method 700 determines whether there are any other potential solutions to the identified database performance issue (step 770). If so (step 770=YES), method 700 loops back to step 740 and continues. When there is no other potential solution (step 770=NO), a notification is sent to a system administrator of the performance issue that could not be resolved automatically (step 780). Method 700 is then done. Because network utilization information can be retrieved from the distributed virtual Ethernet mechanism for both virtual and hardware networks, method 700 allows applying potential solutions according to both virtual and hardware network utilization.

Figure 8:
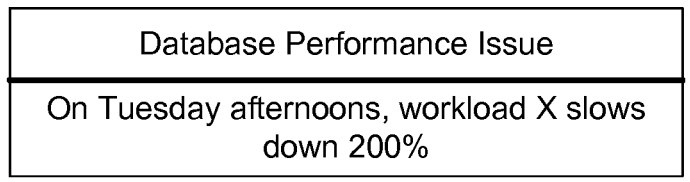
FIG. 8 is a block diagram showing one sample database performance issue.
Figure 9:
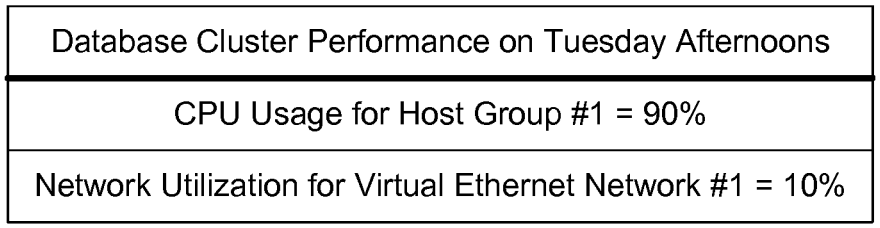
FIG. 9 is a block diagram showing monitored database cluster performance on Tuesday afternoons.
Figure 10:
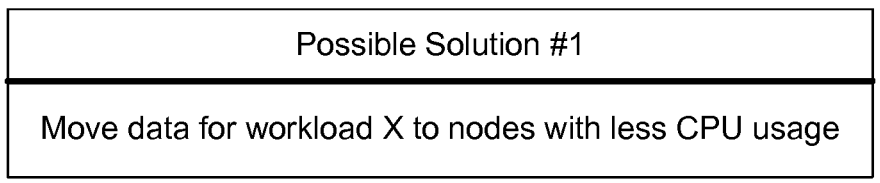
FIG. 10 is a block diagram showing one potential solution to the database performance issue shown in FIG. 8.
Figure 11:
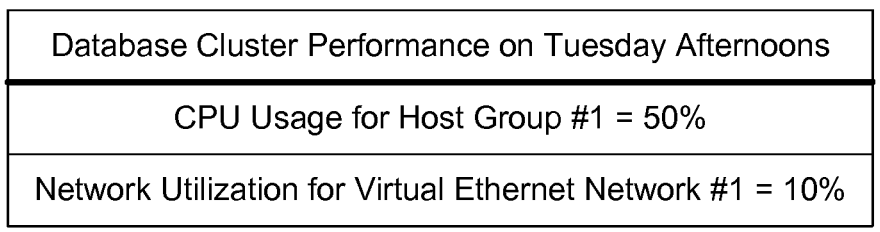
FIG. 11 is a block diagram showing database cluster performance after applying the potential solution in FIG. 10.
Figure 12:
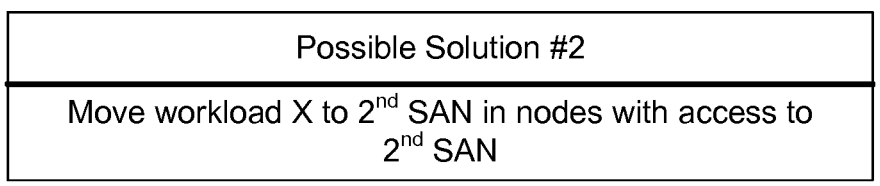
FIG. 12 is a block diagram showing a second potential solution to the database performance issue shown in FIG. 8.

A simple example will illustrate the concepts in FIGS. 6 and 7 discussed above. Referring to FIG. 6, a database performance issue is identified (step 610). One possible database performance issue is shown in FIG. 8, where workload X slows down 200% on Tuesday afternoons. This means workload X takes twice as long to run on Tuesday afternoons that it normally does at other times. The database cluster performance, including utilization for virtual networks, is determined (step 620). We assume for this example Ethernet network #1 is related to the identified database performance issue, which means Ethernet network #1 affects the identified database performance issue. We assume the database cluster performance on Tuesday afternoons is shown in FIG. 9, which indicates CPU usage for Host Group #1 is 90% and network utilization for virtual Ethernet network #1 is 10%. Because the CPU usage is relatively high, one potential solution that could be identified in step 630 in FIG. 6 is to move data for workload X to nodes with less CPU usage, as shown in FIG. 10. We assume the distributed database is reconfigured in step 640 to move data for workload X to nodes with less CPU usage. Method 600 then determines whether the issue is resolved by looking at the database cluster performance on Tuesday afternoons shown in FIG. 11. While the CPU usage for Host Group #1 has dropped from 90% to 50%, we assume the database performance issue shown in FIG. 8 was not resolved (step 650=NO), meaning the reconfiguration of the distributed database did not sufficiently improve the execution time of workload X. The distributed database would then be returned to its previous configuration. We assume a second potential solution exists (step 660=YES), to move workload X to a second SAN in nodes with access to a second SAN, as shown in FIG. 12 (step 630). The database is reconfigured to implement the second potential solution (step 640), but we assume for this example the database performance issue shown in FIG. 8 was not resolved (step 650=NO). The distributed database would then be returned to its previous configuration. We assume there are no other potential solutions that could be automatically applied (step 660=NO), so a system administrator is notified of the performance issue that could not be resolved automatically (step 670). Method 600 is then done.

We now assume for the simple example given above that method 700 in FIG. 7 is used instead of method 600 in FIG. 6. The same database performance issue is identified in FIG. 8. The database cluster performance, including network utilization for both virtual networks and hardware networks, is determined (step 720). The network utilization for both virtual and hardware networks is preferably determined by querying the network monitor mechanism 125 in the distributed virtual Ethernet mechanism 123 shown in FIG. 1. FIG. 13 shows the CPU usage for Host Group #1 is 90%, and the network utilization for virtual Ethernet Network #1 is 10%, similar to that shown in FIG. 9. However, we assume the hardware link #1 is also related to the database performance issue, and the network utilization for hardware link #1 is shown at 100% in FIG. 13. A potential solution is identified in step 740, which is shown in FIG. 14, namely to move data for workload X to a cluster segment that does not use hardware link #1. The distributed database is reconfigured in step 750 to implement the potential solution shown in FIG. 14. We assume this reconfiguration of the database resolves the database performance issue in FIG. 8 (step 760=YES), so method 700 is done. Note when a database reconfiguration does not resolve the identified database performance issue, the database reconfiguration is returned to its previous configuration. When a database reconfiguration does resolve the identified database performance issue, the change in the database configuration is made permanent.

The presence of a distributed virtual Ethernet switch provides a single point in a database system or cluster where network utilization for both virtual and hardware networks may be determined. The distributed virtual Ethernet switch can thus provide its virtualization functions, effectively hiding the underlying implementation of hardware networks when needed, while also providing detailed information regarding hardware network topology and performance that allows a database performance monitor to automatically reconfigure a distributed database to address performance issues at either the virtual network level or at the hardware network level.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A database performance monitor monitors performance of a distributed database, identifies a database performance issue for the distributed database, determines from a distributed virtual network mechanism which physical networks are related to the database performance issue, determines a potential solution to the database performance issue that changes configuration of the distributed database, and applies the potential solution by automatically changing configuration of the distributed database without intervention of a user to address the database performance issue.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A networked computer system comprising:
a plurality of nodes, each node comprising:
   at least one processor; and
   a memory coupled to the at least one processor;
a distributed database residing in the memory of the plurality of nodes;
a distributed virtual network mechanism that includes a mapping of a plurality of virtual networks to a plurality of physical networks that interconnect the plurality of nodes in the distributed database; and
a database performance monitor that monitors performance of the distributed database, identifies a database performance issue for the distributed database, determines from the distributed virtual network mechanism which of the plurality of physical networks are related to the database performance issue, determines a potential solution to the database performance issue that changes configuration of the distributed database, and uses the potential solution by automatically changing configuration of the distributed database without intervention of a user to address the database performance issue, wherein the database performance monitor, after automatically changing configuration of the distributed database, determines whether the changed configuration of the distributed database addressed the database performance issue for the distributed database, wherein, when the database performance monitor determines the changed configuration of the distributed database did not address the database performance issue for the distributed database, the database performance monitor determines whether a second potential solution exists to address the database performance issue, and when the second potential solution exists, the database performance monitor uses the second potential solution by automatically changing configuration of the distributed database without intervention of a user to address the database performance issue, and wherein, when the database performance monitor determines the changed configuration of the distributed database did not address the database performance issue for the distributed database, and when no other potential solution exists to address the database performance issue, the database performance monitor notifies a system administrator that the database performance issue cannot be resolved automatically.

2. An article of manufacture comprising a computer program stored on a non-transitory computer readable storage medium, the computer program comprising:

a database performance monitor that monitors performance of a distributed database residing in memory of a plurality of nodes, identifies a database performance issue for the distributed database, determines from a distributed virtual network mechanism that includes a mapping of a plurality of virtual networks to a plurality of physical networks that interconnect the plurality of nodes in the distributed database which of the plurality of physical networks are related to the database performance issue, determines a potential solution to the database performance issue that changes configuration of the distributed database, and uses the potential solution by automatically changing configuration of the distributed database without intervention of a user to address the database performance issue, wherein the database performance monitor, after automatically changing configuration of the distributed database, determines whether the changed configuration of the distributed database addressed the database performance issue for the distributed database, wherein, when the database performance monitor determines the changed configuration of the distributed database did not address the database performance issue for the distributed database, the database performance monitor determines whether a second potential solution exists to address the database performance issue, and when the second potential solution exists, the database performance monitor uses the second potential solution by automatically changing configuration of the distributed database without intervention of a user to address the database performance issue, and wherein, when the database performance monitor determines the changed configuration of the distributed database did not address the database performance issue for the distributed database, and when no other potential solution exists to address the database performance issue, the database performance monitor notifies a system administrator that the database performance issue cannot be resolved automatically.

3. The article of manufacture of claim 2 wherein the distributed virtual network mechanism comprises a distributed virtual Ethernet mechanism that includes a distributed virtual Ethernet switch.

4. A networked computer system comprising:
a plurality of nodes, each node comprising:
at least one processor; and
a memory coupled to the at least one processor;
a distributed database residing in the memory of the plurality of nodes;
a distributed virtual Ethernet mechanism that includes a distributed virtual Ethernet switch and a mapping of a plurality of virtual networks to a plurality of physical networks that interconnect the plurality of nodes in the distributed database; and
a database performance monitor that monitors performance of the distributed database, identifies a database performance issue for the distributed database, determines from the distributed virtual network mechanism which of the plurality of physical networks are related to the database performance issue, determines a potential solution to the database performance issue that changes configuration of the distributed database, and uses the potential solution by automatically changing configuration of the distributed database without intervention of a user to address the database performance issue, wherein the database performance monitor, after automatically changing configuration of the distributed database, determines whether the changed configuration of the distributed database addressed the database performance issue for the distributed database, wherein, when the database performance monitor determines the changed configuration of the distributed database did not address the database performance issue for the distributed database, the database performance monitor determines whether a second potential solution exists to address the database performance issue, and when the second potential solution exists, the database performance monitor uses the second potential solution by automatically changing configuration of the distributed database without intervention of a user to address the database performance issue, and wherein when the database performance monitor determines the changed configuration of the distributed database did not address the database performance issue for the distributed database, and when no other potential solution exists to address the database performance issue, the database performance monitor notifies a system administrator that the database performance issue cannot be resolved automatically.

* * * * *